United States Patent
Altmejd et al.

(10) Patent No.: US 6,895,520 B1
(45) Date of Patent: May 17, 2005

(54) PERFORMANCE AND POWER OPTIMIZATION VIA BLOCK ORIENTED PERFORMANCE MEASUREMENT AND CONTROL

(75) Inventors: Morrie Altmejd, Austin, TX (US);
Evandro Menezes, Austin, TX (US);
Dave Tobias, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 656 days.

(21) Appl. No.: 09/798,176

(22) Filed: Mar. 2, 2001

(51) Int. Cl.[7] ............................. G06F 1/32; G06F 1/26
(52) U.S. Cl. ..................................... 713/324; 713/320
(58) Field of Search ........................ 710/18; 713/324, 713/323, 320, 321; 702/182

(56) References Cited

U.S. PATENT DOCUMENTS

| | | | | |
|---|---|---|---|---|
| 4,924,428 A | * | 5/1990 | Vea ................................. 714/1 |
| 4,926,353 A | * | 5/1990 | Groezinger .................. 702/182 |
| 5,511,203 A | | 4/1996 | Wisor et al. .................. 395/750 |
| 5,719,800 A | * | 2/1998 | Mittal et al. .................. 713/321 |
| 5,745,375 A | | 4/1998 | Reinhardt et al. ........... 364/492 |
| 5,778,237 A | | 7/1998 | Yamamoto et al. |
| 5,812,860 A | | 9/1998 | Horden et al. .......... 395/750.04 |
| 5,852,737 A | | 12/1998 | Bikowsky .............. 395/750.05 |
| 5,873,000 A | | 2/1999 | Lin et al. ..................... 395/892 |
| 5,881,298 A | | 3/1999 | Cathey .................. 395/750.06 |
| 5,884,049 A | | 3/1999 | Atkinson ..................... 395/281 |
| 5,887,179 A | | 3/1999 | Halahmi et al. ........ 395/750.06 |
| 5,925,133 A | | 7/1999 | Buxton et al. ............... 713/323 |
| 5,958,055 A | * | 9/1999 | Evoy et al. .................. 713/310 |
| 5,958,058 A | | 9/1999 | Barrus .......................... 713/320 |
| 5,978,923 A | * | 11/1999 | Kou ............................. 713/323 |
| 6,014,611 A | | 1/2000 | Arai et al. .................... 702/132 |
| 6,073,244 A | | 6/2000 | Iwazaki ........................ 713/322 |
| 6,076,171 A | | 6/2000 | Kawata ........................ 713/501 |
| RE36,839 E | | 8/2000 | Simmons et al. ............. 326/93 |
| 6,128,745 A | | 10/2000 | Anderson et al. ........... 713/323 |
| 6,151,681 A | | 11/2000 | Roden et al. ................ 713/322 |
| 6,219,723 B1 | * | 4/2001 | Hetherington et al. ......... 710/18 |
| 6,252,878 B1 | * | 6/2001 | Locklear et al. ............. 370/401 |
| 6,353,628 B1 | * | 3/2002 | Wallace et al. .............. 375/220 |
| 6,442,700 B1 | * | 8/2002 | Cooper ......................... 713/320 |
| 6,564,328 B1 | * | 5/2003 | Grochowski et al. ........ 713/320 |
| 6,636,976 B1 | * | 10/2003 | Grochowski et al. ........ 713/320 |
| 6,829,713 B2 | * | 12/2004 | Cooper et al. ............... 713/320 |

FOREIGN PATENT DOCUMENTS

| | | |
|---|---|---|
| EP | 0632360 A1 | 1/1995 |
| JP | 08328698 | 12/1996 |

OTHER PUBLICATIONS

IBM Technical Disclosure Bulletin "Power Management Clock Change for 603 Processor", vol. 38, No. 12, Dec. 1995, pp. 325–327.

* cited by examiner

Primary Examiner—Chun Cao
(74) Attorney, Agent, or Firm—Zagorin O'Brien Graham LLP

(57) ABSTRACT

An integrated circuit includes a plurality of functional blocks. Utilization information for the various functional blocks is generated. Based on that information, the power consumption and thus the performance levels of the functional blocks can be tuned. Thus, when a functional block is heavily loaded by an application, the performance level and thus power consumption of that particular functional block is increased. At the same time, other functional blocks that are not being heavily utilized and thus have lower performance requirements can be kept at a relatively low power consumption level. Thus, power consumption can be reduced overall without unduly impacting performance.

27 Claims, 3 Drawing Sheets

PERFORMANCE AND POWER OPTIMIZATION VIA BLOCK ORIENTED PERFORMANCE MEASUREMENT AND CONTROL

BACKGROUND OF THE INVENTION

1. Field of the Invention

This invention relates to integrated circuits and more particularly to power management in integrated circuits.

2. Description of the Related Art

Large computational devices, e.g., current microprocessors, include many functional units such as one or more fixed point units, load/store units, floating point units (FPU), vector arithmetic units, barrel shifters, instruction and data cache memories, bridge or tunnel circuits, memory controllers, first in first out (FIFO) buffers, and various input/output interface units (e.g., interfaces for universal asynchronous receiver/transmitters (UART), serializer/deserializer (SERDES), HyperTransport™, Infiniband™, PCI bus). In a portable computing environment, where power conservation is particularly important, power management techniques have been implemented to conserve power based on when, e.g., a period of inactivity occurs. The power conservation typically includes stopping clocks for a period of time. However, the clocks are controlled globally, and thus in situations where one part of a processor is being heavily used but another part is being lightly utilized, all the functional blocks in the processor are configured for heavy use. Thus, power may be wasted in situations where, e.g., the fixed point unit is being used but the floating point unit is not being utilized heavily or at all.

In a prior art power savings approach, disclosed in U.S. Pat. No. Re 37,839, functional blocks are deactivated to save power. The activation and deactivation of the functional blocks is controlled by the flow of data within the integrated circuit. Thus, as data flows through the integrated circuit, those functional blocks are turned on and off as necessary to accommodate that data flow.

The amount of power consumed by a functional block is directly related to its performance. In order to allocate power resources more effectively, it would be desirable to be able to dynamically match performance and thus control power consumed by individual functional blocks according to the utilization requirements of the functional blocks. However, current designs generally do not provide information about utilization of the individual functional blocks, and power consumption is not tuned to match the loading of the individual functional blocks. A possible disadvantage to turning clocks on and off based on data flow is that inefficiencies may result due to the time it takes to turn clocks on and off to the various functional blocks. Accordingly, it would be desirable to dynamically adjust the power consumed by functional blocks of an integrated circuit according to the utilization or loading of those functional blocks and thus achieve power savings while maintaining performance.

SUMMARY OF THE INVENTION

The present invention monitors the utilization of the functional blocks in an integrated circuit. Based on that information, the power consumption and thus the performance levels of the functional blocks can be tuned. When a functional block is heavily loaded by an application, the performance level and power consumption of that particular functional block can be increased. At the same time, other blocks that may not be loaded by that application and have lower performance requirements can be kept at a relatively low power consumption level. Thus, power consumption can be reduced overall without unduly impacting performance.

In one embodiment, the invention provides a method for controlling power consumption in an integrated circuit that includes a plurality of functional blocks. The functional blocks generate block utilization information. The power consumption of the respective functional blocks is managed according to respective block utilization information. The power consumption can be managed by adjusting dispatch rate of operations through the particular functional block, adjusting the clock frequency of clocks being supplied to the functional circuit and/or adjusting the voltage along with the clock frequency. In an embodiment, utilization information may be kept on a task basis.

In another embodiment, the invention provides a computer system that includes an integrated circuit that has a plurality of functional blocks. Utilization circuits that are respectively associated with the functional blocks provide block utilization information of the functional blocks. A computer program includes an instruction sequence executable by the integrated circuit to adjust power consumption levels of the functional blocks according to the block utilization information.

In another embodiment an integrated circuit includes a plurality of functional blocks. Utilization circuits respectively associated with the functional blocks provide block utilization information of the functional blocks. The integrated circuit is responsive to the block utilization information to independently adjust power consumption levels of the functional blocks.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
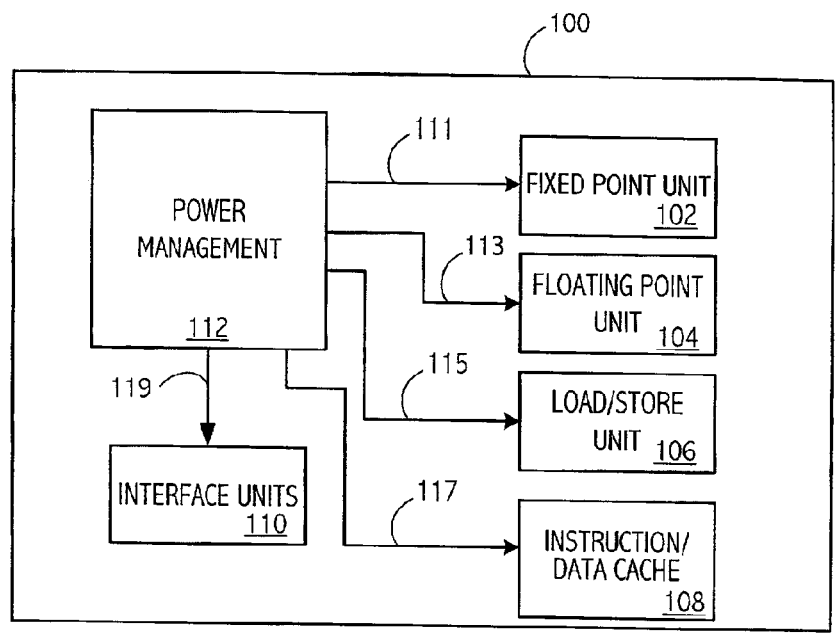
FIG. 1 shows a block diagram of an exemplary integrated circuit incorporating the present invention.

Referring to FIG. 1, a block diagram of an exemplary integrated circuit incorporating an embodiment of the present invention is illustrated. Exemplary processor 100 includes fixed point unit (ALU) 102, a floating point unit (FPLU) 104, a load/store unit 106, instruction/data cache 108, input/output units 110 and a power management unit 112. In one embodiment, power management unit 112 supplies clock signals 111, 113, 115, 117, and 119 to the individual functional blocks. In an embodiment, power management unit 112 adjusts the frequency of the clocks according to the utilization of the functional units. The functional units shown in FIG. 1 are general in nature. Other functional units may be included in addition to or in place of those illustrated.

Figure 2:
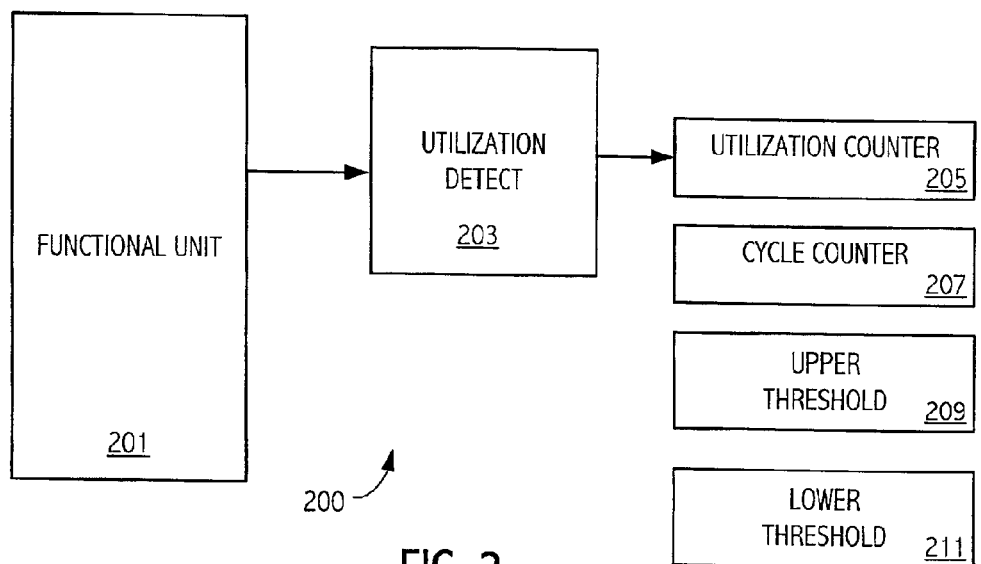
FIG. 2 illustrates a representative functional block and associated detection and counting registers.

An exemplary functional block 200 is shown in FIG. 2. The "function" provided by the functional block 200 shown in FIG. 2 can vary. For example, the functional block 200 may be a floating point unit or a cache memory. Functional block 200 includes the functional unit 201 that performs the "function." Functional unit 100 also includes a utilization detect circuit 203. The functional block 200 generates information indicating the utilization of the block. That information may be a percentage of time that the block is used or conversely, the percentage of time the block is idle. The utilization information can be generated in a number of ways. For example, the utilization of a cache memory may be determined according to the number of cache accesses that occur over a predetermined period of time. Alternately, the cache access utilization may be determined by the percentage of memory accesses that are directed to the cache. In another example, floating point (FPU) utilization may be determined by detecting when the FPU is requested to perform a floating point operation. The number of FPU requests may be counted over a period of time to determine utilization. For an execution unit of a processor, the measured value used to determine utilization may be the number of instructions that are dispatched over a period of time.

Thus, as shown in FIG. 2, a utilization detection circuit 203 is provided that detects when the functional unit is being utilized in the manner described above according to the type of functional unit and the particular information desired. Assume that the utilization detection circuit 203 detects a utilization event, e.g., when an FPU receives a request to perform a floating point operation. That detection causes a utilization counter 205 to increment a count value to indicate that a utilization occurred. The size of the utilization counter depends upon how often the system checks utilization of the functional block, e.g., every 10 microseconds, as well as the number of utilization events that counter 205 is expected to count. The longer the period between checking of block utilization, and/or the more events to be counted, the bigger the counter size required.

In addition to counting the utilization events, a measure may be needed to indicate the period of time over which the counted utilizations occurred. In the exemplary embodiment shown in FIG. 2, cycle counter 207 counts the number of cycles that occurs to provide that information. Cycle counter 207 may be a global counter or a counter local to the functional block. Note that cycle counter 207 may count more slowly than the actual clock rate. For example, cycle counter 207 may count at 100 MHz when the rated processor speed is one GHz. It is sufficient that cycle counter 207 provide an indication of a time period over which utilization counter 205 can be evaluated.

Software, which may reside in the operating system or elsewhere in the electronic system can periodically read utilization counter 205 and cycle counter 207 and determine whether the power consumption and thus the performance of the functional unit matches the load of the functional unit, i.e., its utilization. The power consumption of a functional unit can be adjusted in a number of ways including increasing or decreasing a dispatch rate of instructions into an execution unit (or floating point operations into an FPU), adjusting clock frequency up or down as well as adjusting voltage up or down to match the clock rate. If the functional unit is set for low performance operations and thus has a low power consumption setting and the latest utilization information indicates that the functional unit is heavily loaded, the power consumption and thus performance of the functional unit can be increased to match the performance requirements indicated by the utilization information. In order to increase performance, clock frequency, voltage, and dispatch rate can all be increased. Note that voltage is typically changed only with clock frequency.

If on the other hand, the utilization information indicates that the functional unit is lightly loaded, the clock frequency and/or other power management parameters can be decreased to match the loading. If a particular functional unit is unused or very lightly used, its clocks may even be turned off for a period of time.

In an embodiment, thresholds are provided to determine whether a current power consumption and performance level is appropriate. In order to determine whether current performance levels are adequate as indicated by the utilization information in counter 205, the utilization level can be checked periodically at a predetermined time interval determined by counter 207. Thus, a timer may be provided for each functional unit that indicates how often the utilization counter should be read and the power usage adjusted according to loading factors. When the timer expires, appropriate power management software is notified. The timers could be set differently for different functional units so that each functional unit can be checked at a different time. Alternatively, the operating system or other power management software can read all of the utilization information periodically, with the period being determined by a single timer for all of the functional units.

Alternatively, the value in the utilization counter can be divided by the cycle counter to obtain a utilization per unit time. If that is done, then the utilization counter has to be read before the utilization counter 205 overflows. In either case, the utilization level is compared to upper threshold level 209. If the utilization level is above the upper threshold level 209, clock frequency and/or other performance parameters are increased to provide increased performance. The amount of that increase may be based upon the magnitude of the difference between the calculated utilization level and the upper threshold level. For example, a 10% difference may result in a 10% increase. Alternatively, the increase may occur in fixed steps, e.g., from ¼ of a base clock to ½ of a base clock frequency regardless of the difference between the calculated utilization level and the upper threshold level.

The utilization level may also be compared to the lower threshold value and if the calculated utilization is below the lower threshold level, the clock speed is adjusted downward. Again, the adjustment may be based on the magnitude of the difference between the calculated utilization value and the lower threshold value. Or the adjustment may be fixed between a current level and a next lower level, e.g., from full clock speed in the functional unit to ¾ clock speed. In addition, voltage can be adjusted up or down to match the clock speed for additional power savings.

The threshold registers can be implemented as registers in the functional units or integrated circuit (e.g., model specific registers), system memory, or any other suitable memory that can be used by the software performing the power management function. The values for the threshold registers may be supplied by BIOS, application software or some other initialization source. For example, the values for the threshold registers for each functional block may be calculated empirically by the operating system. Each functional unit would typically have associated with it unique threshold registers.

Figure 3:
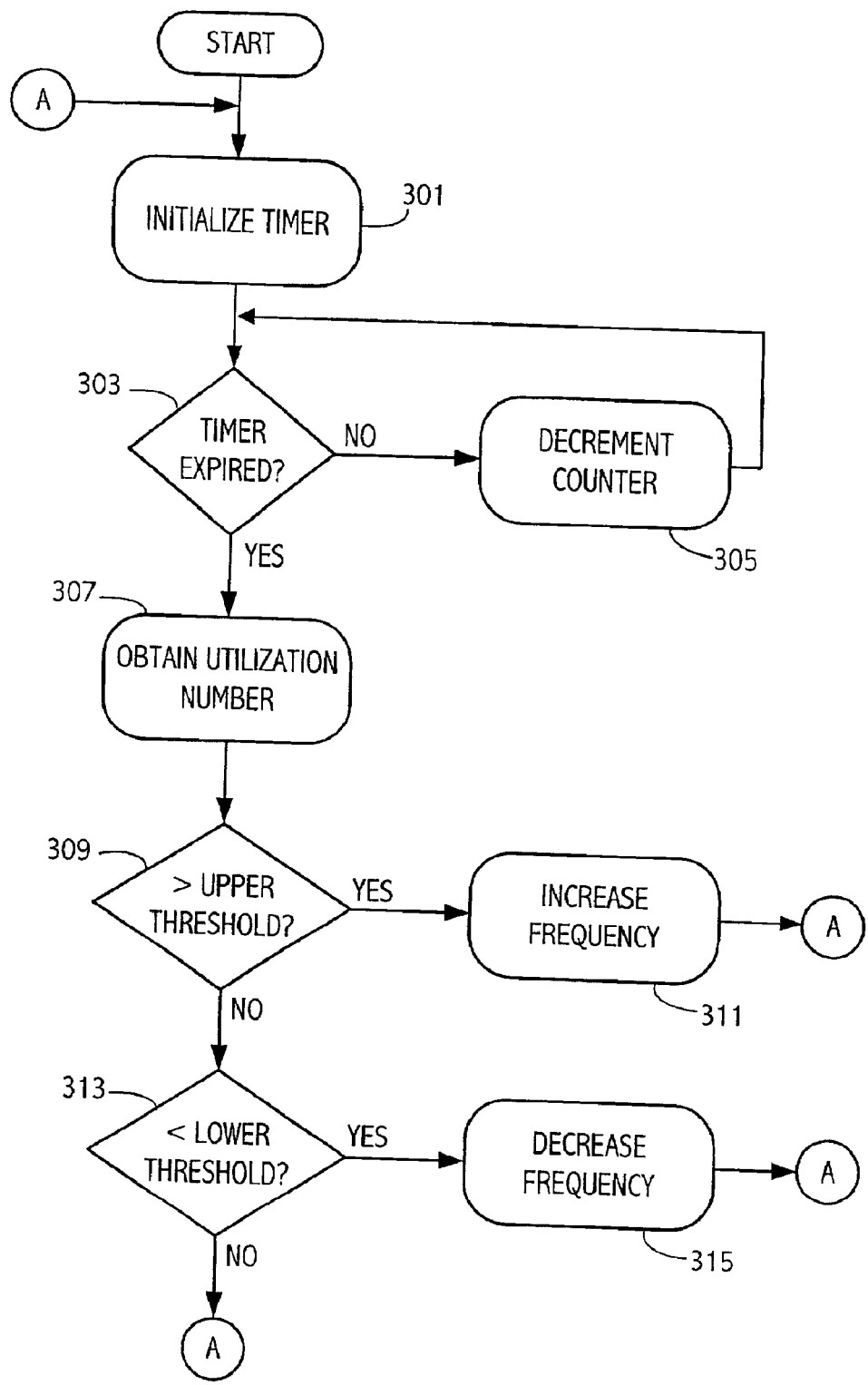
FIG. 3 illustrates a flow diagram of operation of an embodiment of the present invention utilizing threshold values to determine when to adjust the power consumption of a functional block.

FIG. 3 illustrates a flow diagram of operation of an exemplary embodiment utilizing thresholds. The embodiment shown in FIG. 3 could be implemented entirely in hardware, software or a combination, according to the needs of the particular system. On power up, a timer is initialized in 301. The initialization routine may, e.g., load a down counter with a predetermined value. In 303 a comparison is made to see if the counter is expired. If not, the counter is decremented in 305 and the loop continues until the timer has counted down to zero. Once that occurs, a utilization number is obtained in 307. The timer assures that the utilization counter has not overflowed. In other embodiments as described further herein, the utilization counter may be implemented to provide a probability (a rolling average) of the utilization event, and thus there is no risk of utilization counter overflow.

Once an appropriate utilization number is obtained, it is compared to the upper threshold value in 309. If the utilization number is greater than the upper threshold value then in 311, a control indication is provided to power management control logic 112 (see FIG. 1) to increase the clock frequency (and/or other power management parameters as appropriate) of the functional unit. Those parameters can be adjusted by software writing to a clock control register to control the clock frequency being supplied to the functional unit in a manner known in the art, e.g., by selecting a different frequency or specifying a different multiplication value. Writing to a voltage control register can be used to select a different supplied voltage or cause a different voltage to be supplied externally by a voltage regulator. In 313, the utilization number is compared to the lower threshold value and if it is lower, then in 315 a control indication is provided to power management control logic 112 (see FIG. 1) to decrease the clock frequency (and/or other power management parameters as appropriate) of the functional unit. After determining whether or not to adjust power management parameters, the timer is then reinitialized in 301 and the cycle starts over. Note that in one implementation of the flow diagram illustrated in FIG. 3, hardware can be used to alert power management software only when the utilization information is above or below the upper or lower threshold, respectively. Note also that the comparison steps illustrated in comparisons 309 and 311, while shown executing sequentially, may be implemented to execute in parallel.

Figure 4:
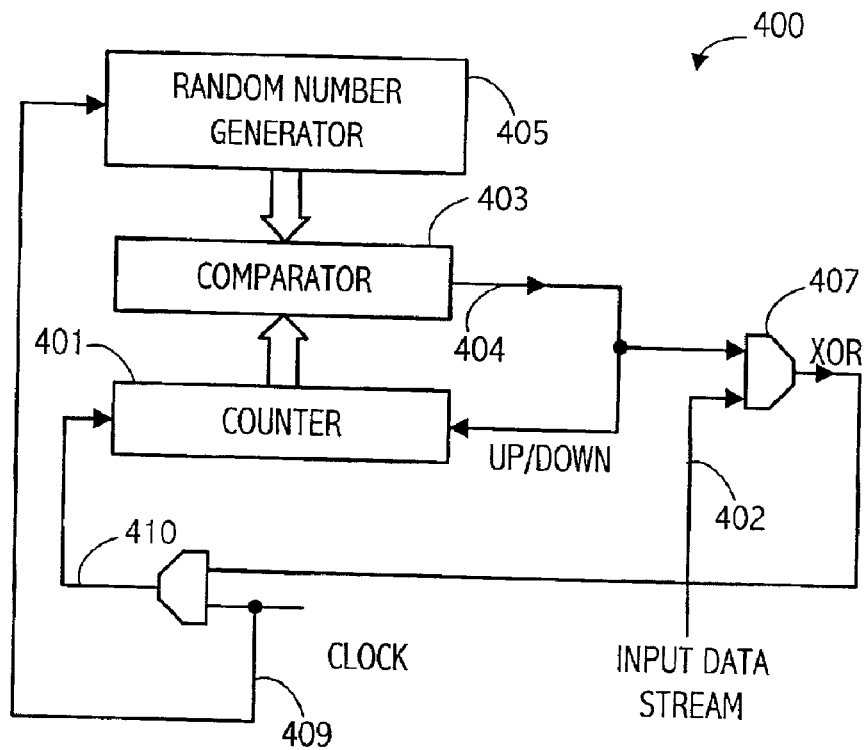
FIG. 4 illustrates a detection circuit that can be utilized to provide a statistical utilization value that provides a rolling average of prior utilizations.

In one embodiment, a non intrusive performance monitoring circuit can be utilized to determine a probability of a utilization event occurring. Such a circuit is shown in FIG. 4 and described in detail in application Ser. No. 09/872,830, entitled "Non-Intrusive Performance Monitoring", filed May 5, 1998, naming Daniel Mann as inventor, which application is incorporated herein by reference in its entirety. One advantage of the non intrusive performance monitoring circuit shown in FIG. 4, is that it provides a mechanism for detecting utilization events without the risk of counter overflow.

FIG. 4 shows one embodiment of an adaptive adder circuit used as a performance monitoring circuit used to integrate the probability stream and determine the relevant probability of a cache hit or other performance parameter occurring. Consider for example, that at each memory access an on-chip cache may successfully provide the required data or may not. The cache utilization, i.e. the hit and miss data is determined by utilization detect circuit 203 (see FIG. 2) and provided as a simple 1 or 0 bit stream to performance monitoring circuit 400 on node 402. Assume a "1" indicates a hit occurring.

A counter 401 provides a count value which is compared in comparator 403 with a random number generated in random number generator circuit 405. If the counter value is greater than or equal to the random number, a 1 is generated. The compare signal 404 output from the comparator is provided back to counter 401 as an up/down count signal. When the comparator indicates that the count is larger than the random number, the compare signal 404 configures the counter 401 as a down counter and when the count is less than the random number, the compare signal 404 configures counter to be an up counter.

The compare signal 404 is compared with the input data stream of interest conveyed on node 402. The input data stream is serially provided samples of the performance parameter being measured (e.g., the cache hit information) which are provided by utilization detect circuit 203. These two stochastic data streams (compare signal and input data stream) are compared to see which one has the highest probability of being 1. That is accomplished by XORing the two data streams together in XOR gate 407. When the data streams differ, there is a difference in probability. That probability information is fed back to increase or decrease the counter value according to the comparator output. The feedback in the illustrated embodiment is accomplished by ANDing together clock signal 409 and the output from XOR gate 407 to provide a gated clock signal 410 to the counter. Consequently, with each new comparison the counter is adjusted to produce a probability stream (from the comparator) which matches the input data stream.

TABLE 1 illustrates the action of the counter:

| comparator | 0 | 1 | 0 | 1 |
| performance parameter data | 0 | 0 | 1 | 1 |
| XOR output | 0 | 1 | 1 | 0 |
| count action | none | down | up | none |

The adaptive adder circuit effectively integrates the probability stream. The probability stream of the parameter being measured is converted into a digital value which is held in the counter. The counter value represents the probability of the parameter which is being measured. Thus, software or hardware can read counter 401 periodically to determine a sliding window average of the parameter of interest. The size of the window can be adjusted to more closely or less closely track changes in utilization of the functional block.

In addition to monitoring block utilization on an overall basis, the operating system (or other power management software) can monitor block utilization on a software task basis. Thus, the operating system can compile utilization information of various functional blocks per task. In such an embodiment the operating system software creates a power management profile that matches a desired performance level for each functional block for a plurality of tasks. The performance level is indicated by desired power consumption parameters (e.g., clock rate, voltage, dispatch rate) for each of the functional blocks. When the operating system switches the processor to executing a task, the power management controller in conjunction with the operating system software sets the appropriate power management parameters to correspond to the particular task. The power management parameters of the functional blocks can be further adjusted during task execution to further improve power management. In addition, rather than operating system software performing task-based power management, application software may instead perform that function.

Selecting a clock frequency for the various functional units can be accomplished by selectively providing to each functional unit that clock selected by a power management controller. For example, the clocks provided to each functional unit may be a full speed clock, a half speed clock and a quarter speed clock. The granularity of the available clock speed will be design dependent. The ability to provide clocks of different speeds, e.g., by dividing down the full speed clock, is well known in the art and not described further herein.

As is also known in the art, it is advantageous from a power savings perspective to reduce voltage when possible because the power saved is proportional to the square of the voltage reduction, whereas the power savings is linear with respect to frequency reduction. In one embodiment, a plurality of voltages are supplied to the integrated circuit, e.g., one for each potential clock speed for the functional units. A suitable voltage is selected that corresponds to the clock speed. In order to avoid the possible unpredictable results, the voltage should not be adjusted downward until the clock speed has been reduced, and the clock speed should not be adjusted upward until the voltage has been increased. In other embodiments the correct voltage for a particular functional block may be a selectable off chip.

It is desirable to reduce any performance impact when adjusting power management parameters in an attempt save power. Thus, it is desirable that the granularity of checking utilization information be sufficiently high that performance degradation, particularly any degradation noticeable to a user, is minimized. From a user's perspective, checking block utilization every ten milliseconds may be sufficient for most tasks. However, given high clock speeds in current integrated circuits, more frequent checking may be desirable, particularly where performance is very important.

There are various other approaches to conserve power that may be utilized in addition to adjusting frequency and voltage. In one embodiment, dispatch rate of instructions can be reduced in order to reduce power consumption of an execution unit. Note also that utilization information may be generated for sub-blocks. Thus, in an embodiment having three execution pipelines that have a combined utilization of, e.g., 30%, several options are available. The clocks to all of the execution pipelines can be reduced, e.g. by one half, to match the load. In another embodiment, several of the pipelines might be shut down while one pipeline is kept operating at full speed. In another embodiment, the clocks can be turned off while operations directed to a particular functional unit accumulate. Once a sufficient number have accumulated, the clocks can be turned back on and the accumulated operations can be executed in a burst mode, and then the clocks can be turned off again.

Thus, a more finely grained power management technique has been described that allows particular sections of an integrated circuit to be controlled independently from other sections to provide both effective power savings along with good performance. The power management techniques can include adjusting such parameters as clock rates, voltages, and dispatch rates.

The description of the invention set forth herein is illustrative, and is not intended to limit the scope of the invention as set forth in the following claims. For instance while operating system software has been described as performing aspects of the power management, any software, including application software, can incorporate the teachings herein. In addition, while the embodiments described herein have been described mostly with relation to a microprocessor, the power savings and performance approach described herein can be implemented in any integrated circuit or electronic device where both performance and power savings are considerations. Other variations and modifications of the embodiments disclosed herein, may be made based on the description set forth herein, without departing from the scope and spirit of the invention as set forth in the following claims.

What is claimed is:

1. A method of controlling power consumption in an integrated circuit that includes a plurality of functional blocks, comprising:

generating respective block utilization information for the functional blocks included in the integrated circuit; and independently managing power of the respective functional blocks to match respective block utilization levels according to the respective block utilization information.

2. The method as recited in claim 1 wherein the operation of managing power includes independently adjusting frequency of clocks being respectively supplied to the functional blocks according to the block utilization information.

3. The method as recited in claim 1 wherein the operation of managing power includes adjusting a voltage being supplied to one of the functional blocks independently of voltages being supplied to other functional blocks according to the utilization information of the one functional block.

4. The method as recited in claim 1 wherein the operation of managing power includes adjusting dispatch rate of operations to at least a section of one of the functional blocks according to the block utilization information associated with the one functional block.

5. The method as recited in claim 1 wherein the block utilization information from one of the functional blocks provides an indication of what percentage of time the one functional block is being used.

6. The method as recited in claim 1 wherein the block utilization information from one of the functional blocks provides dispatch information relating to how many operations have been dispatched to or within the functional block.

7. The method as recited in claim 1 wherein the functional blocks include at least one of a fixed point unit, an arithmetic logic unit, a floating point unit, a barrel shifter, a load/store unit, a memory controller, an input/output interface unit and a cache.

8. The method as recited in claim 1 wherein the utilization information indicates how much time the functional block spends idling.

9. The method as recited in claim 1 further comprising monitoring block utilization on a task basis.

10. The method as recited in claim 9 further comprising adjusting power consumption of at least one of the functional blocks when a task switch occurs from a first task to a second task according to the block utilization information for the one functional block corresponding to the second task.

11. The method as recited in claim 1 further comprising:

reading utilization information from a utilization register associated with one of the functional blocks; and adjusting power usage of the one functional block according to the utilization information read.

12. The method as recited in claim 1 further comprising comparing utilization information related to one of the blocks to at least one threshold value to determine whether to adjust power usage.

13. The method as recited in claim 1 further comprising:

adjusting the frequency of a first clock being supplied to one of the functional blocks upward, when first utilization information for the one block is above a first threshold; and adjusting the frequency of the first clock downward when the first utilization information for the one block is below a second threshold.

14. The method as recited in claim 1 further periodically checking utilization information for a plurality of the functional blocks.

15. The method as recited in claim 1 further comprising checking utilization information on a periodic basis for at least one of the functional blocks to determine whether to adjust power consumption of the one functional block to reflect current utilization information.

16. An integrated circuit comprising:

a plurality of functional blocks;

utilization circuits respectively associated with the functional blocks coupled to provide block utilization information of the functional blocks; and wherein the integrated circuit is responsive to the block utilization information to independently adjust power consumption levels of the functional blocks to match respective block utilization levels.

17. The integrated circuit as recited in claim 16 wherein at the power consumption levels of the functional blocks are determined at least in part by independently adjustable clock frequencies of respective clocks being supplied to the functional blocks.

18. The integrated circuit as recited in claim 17 wherein the power consumption levels of the functional blocks are determined at least in part according to independently controllable voltages being supplied to respective ones of the functional blocks.

19. The integrated circuit as recited in claim 16 further comprising:

a clock control circuit coupled to independently adjust the frequency of respective clocks being supplied to the functional blocks.

20. The integrated circuit as recited in claim 16 further comprising registers associated with respective utilization circuits of the functional blocks containing block utilization information.

21. The integrated circuit as recited in claim 16 wherein the utilization circuits are software accessible.

22. The integrated circuit as recited in claim 16 further including software operable on the integrated circuit to read utilization information of a selected functional block and to control at least one power performance parameter of the selected functional block in response thereto.

23. A computer system comprising:

an integrated circuit that includes a plurality of functional blocks;

utilization circuits respectively associated with the functional blocks and coupled to provide block utilization information of the functional blocks; and a computer program including an instruction sequence executable by the integrated circuit to adjust power consumption levels of the functional blocks to match respective block utilization levels according to the block utilization information.

24. The computer system as recited in claim 23 wherein the computer program tracks utilization information for each of the functional blocks on a task basis.

25. The computer system as recited in claim 24 wherein the computer program is responsive to a task switch from a first task to a second task to adjust power management parameters for one or more of the functional blocks according to utilization information corresponding to the second task.

26. An electronic system comprising:

an integrated circuit including a plurality of functional blocks;

means for determining respective block utilization information of the functional blocks; and means for adjusting power consumption of the respective functional blocks to match respective block utilization levels according to the respective block utilization information.

27. The method of claim 1, wherein the independently managing power of the respective block functional blocks to match respective block utilization levels comprises:

increasing power consumption levels for those functional blocks with utilization information that indicates increased utilization; and decreasing power consumption levels for those functional blocks with utilization information that indicates decreased utilization.

* * * * *